Sept. 15, 1931. B. W. NORDLANDER 1,823,698
METHOD FOR TREATING SULPHUR DIOXIDE GAS
Filed July 1, 1929
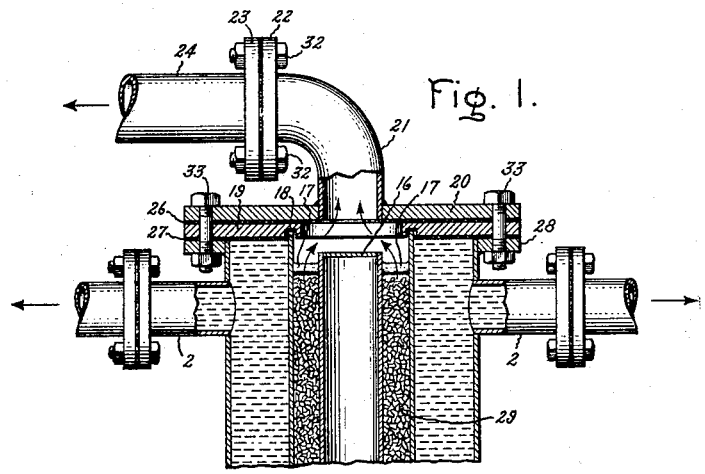
Fig. 1.
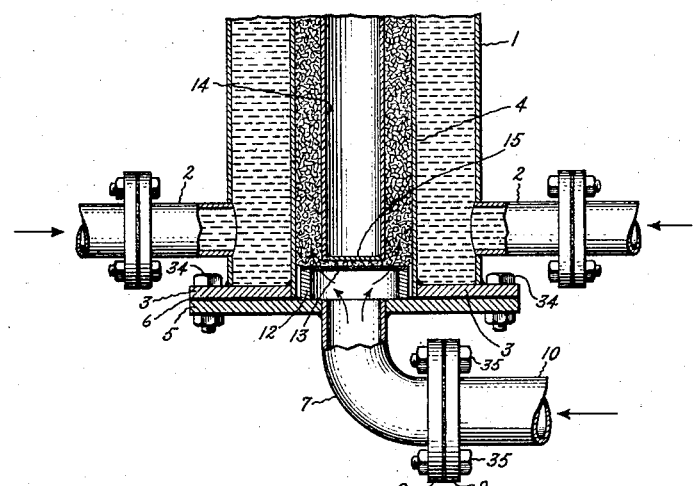
Fig. 2.
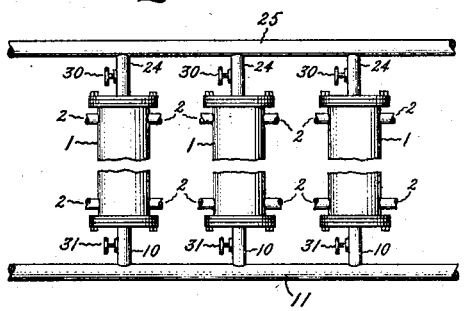
Inventor:
Birger W. Nordlander,
by Charles E. Tullar
His Attorney.

Patented Sept. 15, 1931

1,823,698

UNITED STATES PATENT OFFICE

BIRGER W. NORDLANDER, OF SCHENECTADY, NEW YORK, ASSIGNOR TO GENERAL ELECTRIC COMPANY, A CORPORATION OF NEW YORK

METHOD FOR TREATING SULPHUR DIOXIDE GAS

Application filed July 1, 1929. Serial No. 375,226.

This invention relates broadly to a new and improved method and apparatus for treating sulphur dioxide gas. More specifically it relates to a novel means and method of removing practically all of the sulphur trioxide in sulphur dioxide gas.

When sulphur and oxygen are burned under ordinary conditions to form sulphur dioxide, sulphur trioxide is always formed. About 3% $SO_3$ is formed even when sulphur is burned in pure dry oxygen, and considerably more, usually about 12% $SO_3$ when sulphur is burned in air, even in the most efficient types of burners now used.

In many cases substantially pure, dry sulphur dioxide gas is necessary, and any appreciable amount of sulphur trioxide present therein is highly objectionable. It is known, for example, that sulphur trioxide in the presence of moisture is converted to sulphuric acid which attacks metals very readily. In certain systems of refrigeration which employ $SO_2$ as the refrigerant, it is absolutely necessary to have sulphur dioxide gas which is dry and substantially free from $SO_3$. In the paper industry, for example, where sulphur dioxide is generally used to form the calcium bisulfite used in the digesters, any appreciable amount of $SO_3$ in the $SO_2$ gas must be avoided since the $SO_3$ reacts with the calcium oxide used to form calcium sulfate which is insoluble and clogs up the apparatus.

The $SO_3$ in $SO_2$ burner gas exists in the form of a very fine mist of colloidal dimensions which is extremely difficult to remove by scrubbing with water or even alkali. The mist apparently travels right through the liquid, and only an insignificant amount is absorbed. Filtration of the $SO_2$ gas through such filter materials as asbestos, alundum, sintered glass, plaster of Paris, sand, etc., is not entirely effective, since the finest part of the mist always goes right through the filter.

I have found that if $SO_3$ is passed through a layer of finely divided sulphur, a reduction to $SO_2$ takes place and this reaction proceeds to completion at room temperature. This action depends on the formation of an unstable intermediate oxide, sulphur sesquioxide, $S_2O_3$, of brown to bluish color, which decomposes to form $SO_2$ and insoluble amorphous sulphur according to the reactions:

$$2SO_3 + 2S \rightarrow 2S_2O_3$$
$$2S_2O_3 \rightarrow 3SO_2 + S\mu$$

the net result being $$2SO_3 + 2S \rightarrow 3SO_2 + S\mu$$

This method furnishes a simple way of removing the $SO_3$ from the $SO_2$ gas, at the same time converting it into $SO_2$, thus making the total yield 100%.

It has been found that after a certain period of time the sulphur becomes "poisoned". By heating the sulphur which has become inactive to about 75-80° C. preferably at the same time passing an inert gas over the sulphur, its activity is restored. By fusing sulphur with bentonite or carbon black or, in general, a colloidal substance with a large surface, a more active form of sulphur is obtained, which reduces dry $SO_3$ to $SO_2$ with ease. Such active sulphur consists, it is believed, of amorphous sulphur adsorbed on the surface of the colloidal substance.

I have also found that selenium sulfide is extremely active and will reduce $SO_3$ to $SO_2$ very effectively. If this compound is kept at about 80°-85° C., it is far more effective in reducing $SO_3$ to $SO_2$ than ordinary sulphur. This is due to the fact that selenium sulfide ($SeS_2$) as prepared by me according to the methods outlined in my copending application, Serial No. 350,836, filed March 28, 1928, assigned to the same assignee as the present invention, has two extremely active sulphur atoms in the molecule.

In the accompanying drawings forming part of this application, Fig. 1 is a view, broken away, partly in section and partly in elevation, of an apparatus whereby my invention may be carried into effect; and Fig. 2 is a fragmentary elevational view of a battery of apparatus shown in Fig. 1.

The preferred form of apparatus comprises in general, an upright metal cylinder of suitable dimensions, provided with inlets and outlets 2 so that water or any other suitable fluid, at a suitable temperature, may be circulated therethrough. The cylinder 1 is provided with a base plate 3, which is preferably in the form of a ring to which is fixed, as by welding, near its outer circumference the adjacent end of the cylinder 1. Within and coaxial with the cylinder 1 is another cylinder 4 of smaller diameter which is also suitably fixed, as by welding, to the base plate 3. The welded end portion of the inner cylinder 4 fits within the center opening of the base plate 3. Removably fixed to the base plate 3 is another ring member 5 and between the members 3 and 5 a suitable packing 6 is interposed. Suitably joined to the ring member 5 at its central portion is one end of an elbow 7, the other end of the elbow being formed with a flange 8. Flange 8 is removably connected to flange 9 which is fixed to inlet pipe 10, which in turn connects with main pipe 11 through which the $SO_2$ gas to be purified travels.

A ring member 12 is suitably fixed to the ring 5 and serves as a support for the perforated plate 13, which may be made of any suitable material. Within the cylinder or tube 4 is still another cylindrical member 14 which has its ends closed as by plates 15 and 16, and which is rigidly fixed to the inside of the cylinder 4 as by members 17 suitably spaced around its surface. Resting on the top end of the cylinder 1 and having a grooved ring portion 18 to receive the upper end of cylinder 4 is the ring member 19. On top of this member 19 is an annular member 20, similar to the member 5, and fixed thereto is one end of the elbow 21. To the other end of the elbow 21 is fixed a flange portion 22 cooperating with and removably fixed to flange member 23 which is in turn connected with pipe 24, the latter leading to the main outlet pipe 25 for the purified $SO_2$ gas. Interposed between members 19 and 20 is a suitable packing ring 26. The members 19 and 20 and packing rings 26 and 27 are clamped together in conjunction with a ring 28 which is placed under these members and surrounds the outer surface of the cylinder 1. The space between the inner surface of the cylinder 4 and the outer surface of the cylinder 14 is practically filled with the purifying medium 29, which is preferably selenium sulfide.

In Fig. 2 I have shown an arrangement whereby a battery of purifiers may be set up and operated in accordance with my invention. I have shown for purposes of illustration only three of these units connected to the main inlet and outlet pipes 11 and 25, respectively, for the $SO_2$ gas, although it will be apparent that any number might be used. The arrangement is particularly useful in quantity production when $SO_2$ gas is purified on a large scale. As will be noted, valves 30 control the outlet pipes 24 of each of the units, while valves 31 control the inlet pipes 10 of the units. This arrangement makes it possible to keep any or all of the units going at one time without interference with each other. For example, when one unit is being charged with a fresh batch of purifying material the operation of the other units need not be stopped.

In order to fill a unit with purifying material, flange 22 is freed from flange 23 by removing bolts 32 holding these members together. Bolts 33 are then removed and the member 20 may be easily removed by sliding the flange 22 on the adjacent face of the flange 23 until clear thereof. The material may then be introduced into the space between members 4 and 14. Perforated plate 13 acts as a support for the material, and allows the $SO_2$ gas to travel upwardly therethrough. In order to remove the purifying material 29 from the unit, it is merely necessary to remove bolts 34 and 35 and slide the member 5 and the parts fixed thereto, downwardly. The material may be caught in a suitable container placed beneath the unit operated on. It is, of couse, obvious that the valves 30 and 31 in conjunction with the unit being filled or emptied, will be turned off while these operations are carried on. These valves are placed beyond the flange members 8, 9, and 22, 23 and close to the main inlet and outlet pipes, so that no $SO_2$ can escape into the atmosphere when they are turned off.

In operation, assuming that the units have been filled with the purifying material, fluid at a temperature of from 80–85° C. is circulated through pipes 2 and container 1. The $SO_2$ gas to be purified, which preferably should be dried before entering container 41, enters the inlet pipe 10 of the unit and is, of course, under a regulated amount of pressure. The gas travels upwardly as indicated by the arrows in Fig. 1 within the tube or cylinder 4 and through the purifying material 29. Here the $SO_3$ is reduced to $SO_2$ and the gas, by the time it reaches the entrance to elbow 21, is practically pure $SO_2$ gas. The pure gas leaves by outlets 24, 25 for use where necessary.

By arranging the purified material within tube or cylinder 4, and around the hollow cylinder 14, as shown, a relatively large surface is presented to the $SO_2$ gas and at the same time the purified material is more easily kept at a uniform temperature.

While I have indicated the use of the purifying material at a temperature of 80–85° C., it is to be understod that the material may be used at room temperature as effectively to remove $SO_3$ from $SO_2$ gas. When kept at the above temperature range selenium sulfide is capable of being used longer before it becomes inactive.

If selenium sulfide is used as the purifying material and it becomes inactive its activity may be restored by regrinding the material. The decrease in activity is probably due to the removal of all the active sulphur at the surface, which when inactive always appears black, probably due to the presence of selenium, reduced from selenium sulfide. Regrinding brings back the activity by presenting a fresh surface of $SeS_2$.

With the apparatus and method of my invention it is possible to produce an $SO_2$ gas having as low as 0.00005% $SO_3$ therein after purification. Ordinary burner gas having anywhere from 3 to 12% $SO_3$ may hence have this $SO_3$ effectively removed therefrom. In my copending application, Serial No. 372,868, filed June 22, 1929 assigned to the same assignee as the present invention, I have provided means and method for making $SO_2$ gas substantially free from $SO_3$. Such gas may be further purified by means of my present invention.

What I claim as new and desire to secure by Letters Patent of the United States, is:

1. The method of removing substantially all but a trace of sulphur trioxide from sulphur dioxide gas, which consists in passing such gas through a body containing active sulphur.

2. The method of removing substantially all but a trace of sulphur trioxide from sulphur dioxide gas, which consists in passing such gas through a compound of selenium containing active sulphur therein.

3. The method of treating a gas which consists mainly of sulphur dioxide but contains an appreciable amount of sulphur trioxide, which comprises passing such gas through a substance containing sulphur in chemically active form as the purifying medium.

4. The method of removing substantially all but a trace of sulphur trioxide from sulphur dioxide gas, which consists in passing such gas through selenium sulfide.

5. The method of removing substantially all but a trace of sulphur trioxide from sulphur dioxide gas, which consists in passing such gas through selenium sulfide at a temperature of about 80–85° C.

In witness whereof, I have hereto set my hand this 29th day of June, 1929.

BIRGER W. NORDLANDER.